No. 653,046. Patented July 3, 1900.
C. L. WASHBURN & A. C. PERHAM.
WOODEN RIM FOR WHEELS.
(Application filed Apr. 6, 1900.)
(No Model.)
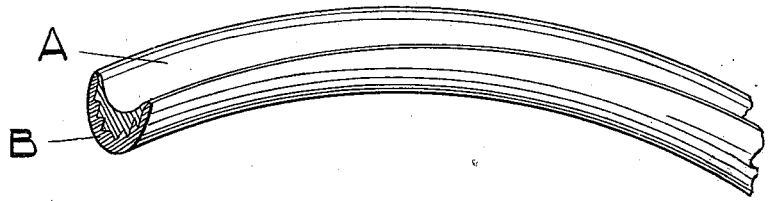
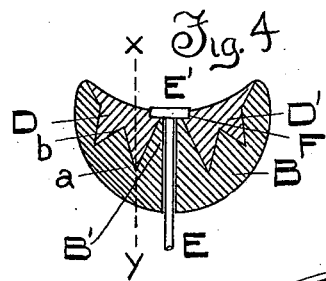
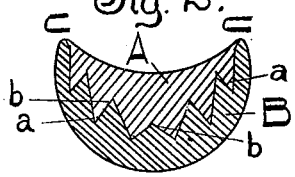
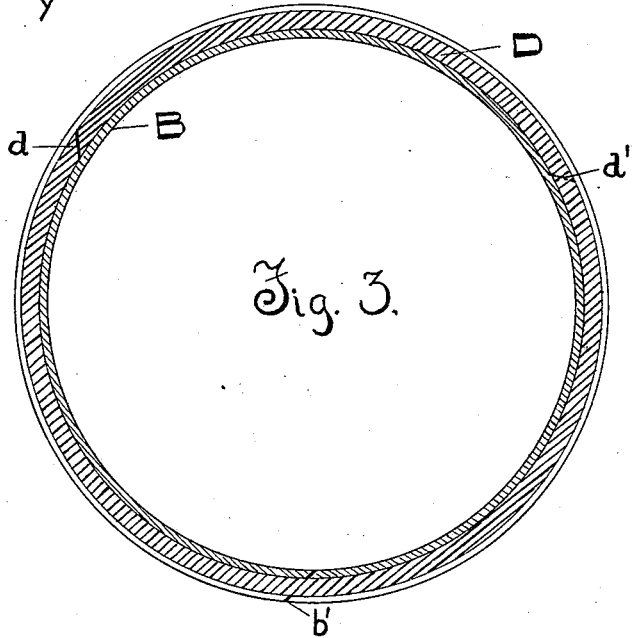
Witnesses
George N. Richards
Wm. R. Davis
Inventors
Calvin L. Washburn,
Alfred C. Perham,
by W. H. Babcock
Attorney
THE NORRIS PETERS CO., PHOTO-LITHO., WASHINGTON, D. C.

UNITED STATES PATENT OFFICE.

CALVIN L. WASHBURN AND ALFRED C. PERHAM, OF PARIS, MAINE.

WOODEN RIM FOR WHEELS.

SPECIFICATION forming part of Letters Patent No. 653,046, dated July 3, 1900.

Application filed April 6, 1900. Serial No. 11,885. (No model.)

*To all whom it may concern:*

Be it known that we, CALVIN L. WASHBURN and ALFRED C. PERHAM, citizens of the United States, residing at Paris, in the county of Oxford and State of Maine, have invented certain new and useful Improvements in Wooden Rims for Vehicle-Wheels; and we do hereby declare the following to be a full, clear, and exact description of the invention, such as will enable others skilled in the art to which it appertains to make and use the same.

The object of our invention is to produce a wooden rim for bicycle or other vehicle wheels which shall be stronger, stiffer, and more durable, although not exceeding in weight or size any other form of rim; and said invention consists in the construction and combination of parts hereinafter more particularly set forth and claimed.

In the accompanying drawings, Figure 1 represents a perspective view of a part of a rim embodying our invention in one modification. Fig. 2 represents a cross-section of the same on a larger scale. Fig. 3 represents a longitudinal section of a rim on line $x\ y$, Fig. 4, embodying another modification of our invention; and Fig. 4 represents a cross-section of the same, on a larger scale, showing the method of inserting the spokes.

The said rim consists of two or more annular wooden strips, which when put together form a rim of similar shape and size to the ordinary single-piece wooden rim, concavo-convex in cross-section.

B designates the annular strip which forms the convex side or inner periphery of the rim, and A, Figs. 1 and 2, represents the annular strip which forms the concave or outer periphery of the rim next the tire. Said strips are provided with a multiplicity of longitudinal pointed tongues $a$ and grooves $b$ on their adjacent sides, which when the strips are put together and glued or cemented in place will fit exactly into each other. These tongues and grooves are of varying shapes and depths; but near the center of the rim the tongues of strip A and grooves of strip B, respectively, are of course deeper than those near the edges. The two strips are preferably formed of differently-grained wood, and their four peripheral edges meet at the outside of the rim to form the two projecting peripheral edges C C of the complete article, thus greatly strengthening said edges C C by the overlapping of the differently-grained strips. The said strips are each joined together at their ends after being bent in the usual manner by any form of joint such as in general use for wooden rims, and strip A is bent and joined around strip B after the latter has been bent and joined at its ends.

In the modification shown in Figs. 3 and 4 instead of strip A we employ two parallel strips D D', similarly provided with tongues and grooves, but with their inner edges not quite meeting at the center of the concave periphery of the rim, where a narrow annular strip B' of part B will thus appear. In the former modification the spokes may be inserted through both parts A and B; but in this modification each spoke E will pass only through part B and be fastened by the usual washer E', inserted in a countersunk depression F, which is made in the strip B' and adjoining strips D D', so that said washer will overlap the latter. These strips D D' have their ends joined at $d\ d'$, respectively, each one-third of the perimeter of the rim from the other and from the joint $b'$ of the strip B. The joint $d'$ of strip D' is shown in dotted lines, Fig. 3. It will be evident that in both of these modifications the edges of the rim are protected in such a manner by our overlapping differently-grained strips as to make it impossible to split or break them away. The tendency of any pneumatic tire, especially one of the Dunlop variety, when striking an obstacle is to bring a severe strain on the edges of the rim, thus forcing or breaking them away or splitting the rim. This danger we entirely overcome, as the greater the strain thus produced the harder the strips will be forced together.

In the modification of Figs. 3 and 4 it will be seen that the washer on the end of the spoke will rest on three different grains of wood, reducing very largely any liability to split. Also the placing of the joints of the several strips each at one-third around the perimeter of the rim distributes said joints so as to receive the least strain and remove all liability of the rim parting at its joined ends.

It is evident that the mean line in cross-section of either modification drawn from edge to edge of the completed rim, approximately through the centers of all the tongues, would be a curve about equally distant at all points from both the convex and concave surfaces of the rim. The object of this construction is to make the strips as strong as possible everywhere, with no unduly thin or weak places.

Other obvious advantages of our composite rim are that it will never warp or twist out of shape and that no glue points or edges are exposed when the tire is put on, so as to come apart when reached by dampness. Also that it can be manufactured at about the same cost as a single-piece rim, though much superior to both it and the ordinary laminated rim.

Having thus fully described our invention, what we claim as new, and desire to secure by Letters Patent, is—

1. A wooden rim consisting of adjacent, annular strips of opposing grains, provided with longitudinal, interlocking tongues and grooves, and having the lateral parts of the said strips converging outwardly to the same lateral line on each side, in order that the opposing grains of these converging lateral parts may brace each other and make a single strong edge on each side, substantially as set forth.

2. A wooden rim consisting of adjacent, annular strips provided with interlocking, longitudinal tongues and grooves which are pointed in cross-section and of varying depths in order that the strain may be distributed through different layers of the grooved wood, substantially as set forth.

3. A wooden rim consisting of adjacent, annular strips having longitudinal, interlocking tongues and grooves which are pointed in cross-section and of depths varying so that a mean line in said cross-section passing through all the tongues from edge to edge of the rim is approximately at an equal distance from the convex and concave surfaces of the said rim at all points, thus bisecting the said rim into two crescent-form parts, substantially as set forth.

4. A wooden rim, concavo-convex in cross-section and composed of an annular strip B forming the convex or inner periphery of said rim, and two parallel annular strips D, D, forming the concave or outer periphery of said rim, said strips being provided with interlocking, longitudinal tongues and grooves, and said parallel strips not quite meeting at their inner edges, so as to leave a narrow annular portion B' of the strip B visible between said edges, each of the countersinkings for the spoke-washers being made in said strip B at B' and in the adjacent parts of the strips D, D, substantially as and for the purpose set forth.

In testimony whereof we affix our signatures in presence of two witnesses.

CALVIN L. WASHBURN.
ALFRED C. PERHAM.

Witnesses:
CHESTER H. LANE,
P. C. FICKETT.